(12) United States Patent
Hoghoj et al.

(10) Patent No.: US 7,430,277 B2
(45) Date of Patent: *Sep. 30, 2008

(54) OPTICAL DEVICE FOR X-RAY APPLICATIONS

(75) Inventors: Peter Hoghoj, Saint Martin le Vinoux (FR); Aurélien Dariel, Saint-Nizier du Moucherotte (FR); Sergio Rodrigues, Voreppe (FR)

(73) Assignee: Xeoncs (FR)

( * ) Notice: Subject to any disclaimer, the term of this patent is extended or adjusted under 35 U.S.C. 154(b) by 150 days.

This patent is subject to a terminal disclaimer.

(21) Appl. No.: 10/518,284

(22) PCT Filed: Jun. 19, 2003

(86) PCT No.: PCT/FR03/01879

§ 371 (c)(1),
(2), (4) Date: Sep. 2, 2005

(87) PCT Pub. No.: WO04/001769

PCT Pub. Date: Dec. 31, 2003

(65) Prior Publication Data

US 2006/0018429 A1    Jan. 26, 2006

(30) Foreign Application Priority Data

Jun. 19, 2002  (FR) .................................. 02 07546
Jan. 21, 2003  (FR) .................................. 03 00623

(51) Int. Cl.
*G21K 1/06*  (2006.01)

(52) U.S. Cl. ........................................ 378/84; 378/145

(58) Field of Classification Search ............. 378/70–85, 378/145; 359/868–869, 584
See application file for complete search history.

(56) References Cited

U.S. PATENT DOCUMENTS 4,562,583 A     12/1985   Hoover et al.
4,599,741 A *   7/1986    Wittry ......................... 378/85

(Continued)

FOREIGN PATENT DOCUMENTS

EP            0115892        8/1984

(Continued)

OTHER PUBLICATIONS

Sasanuma, et al., A point-focusing small angle x-ray scattering camera using a doubly curved monochromator of a W/Si multilayer:, Rev. Sci. Instrum., vol. 37, No. 3, pp. 688-692, Mar. 1, 1996.

(Continued)

*Primary Examiner*—Jurie Yun
(74) *Attorney, Agent, or Firm*—Lerner, David, Littenberg, Krumholz & Mentlik, LLP

(57) ABSTRACT

The invention relates to an optical device intended to treat an incident X-ray beam. The optical device comprises a monochromator and an optical element for conditioning the incident beam. The reflective surface of the optical element is able to produce a two-dimensional optical effect in order to adapt a beam in destination of the monochromator. The reflective surface of the optical element comprises a multilayer structure type surface that is reflective to X-rays. In particular, the reflective surface consists of a single surface shaped according to two curvatures corresponding to two different directions.

15 Claims, 4 Drawing Sheets

U.S. PATENT DOCUMENTS

| | | | |
|---|---|---|---|
| 5,127,028 | A | 6/1992 | Wittry |
| 5,142,561 | A | 8/1992 | Doumas |
| 5,373,544 | A * | 12/1994 | Goebel .................. 378/71 |
| 5,619,548 | A | 4/1997 | Koppel |
| 5,799,056 | A | 8/1998 | Gutman |
| 5,999,262 | A | 12/1999 | Dobschal et al. |
| 6,041,099 | A | 3/2000 | Gutman et al. |
| 6,226,349 | B1 | 5/2001 | Schuster et al. |
| 6,278,764 | B1 | 8/2001 | Barbee, Jr. et al. |
| 6,285,506 | B1 | 9/2001 | Chen |
| 6,317,483 | B1 | 11/2001 | Chen |
| 6,829,327 | B1 * | 12/2004 | Chen ..................... 378/44 |
| 2004/0096034 | A1 | 5/2004 | Michaelsen et al. |

FOREIGN PATENT DOCUMENTS

| | | |
|---|---|---|
| GB | 2217036 A | 10/1989 |
| WO | WO-01/08162 | 2/2001 |
| WO | WO-02/103710 A2 | 12/2002 |

OTHER PUBLICATIONS

Naudon et al., "New Apparatus for Grazing Reflectometry in the Angle-Resolved Dispersive Mode", J. Appl. Cryst, vol. 22, Part 5, pp. 460-464, Oct. 1, 1989.

M.P. Ulmer, Production and performance of multilayer coated conic sections, Jul. 2001, SPIE, vol. 4496, p. 127-133.

M.P. Ulmer, The Fabrication of Wolter I multilayer coated optics via electroforming: an update, Jul. 1999, SPIE, vol. 3773, p. 113-121.

M. Schuster et al., Laterally Graded Multilayer Optics for X-ray Analysis, SPIE, vol. 3767, Jul. 1999, p. 183-198.

Romaine et al., Multilayer Optics for Hard X-ray Astronomy, SPIE, vol. 4138, Nov. 2000, p. 120-125.

Headrick et al., Mutlilayer Optics for a Wiggler Beamline (invited), Mar. 2002, Review of Scientific Instruments, vol. 43, No. 3, p. 1476-1479.

G.E. Ice, "Microbeam Forming Methods for Synchrotron Radiation,"© 1997.

Ovonyx; Design News; "Focusing ring: first step toward scanning X-ray microsope," 13 pages.

Research & Development, Nov. 1988 by B. Volbert "New X-ray Spectrometer Technology Improves Both Speed and Accuracy," 8 pages.

Morawe CH et al., entitled "Production of x-ray multilayer coatings by plasma sputtering" (VIDE; VIDE: Science, Technique et Applications 1999 Soc Francaise du Vide, France, vol. 4 (4), No. 294, 1999, pp. 467-472).

Ping Lee, entitled: "Uniform and graded multilayers as X-ray optical elements" (Applied Optics USA, vol. 22, No. 8, Apr. 15, 1983, pp. 1241-1246).

Kleineberg et al., "Bufferlayer and Caplayer Engineering of Mo/Si EUVL Multilayer Mirrors", Soft X-Ray and EUV Imaging Systems II, Daniel A. Tichenor, James A. Folta, Editors, Proceedings of SPIE, vol. 4506 (2001), pp. 113-120.

Niggemeier et al., "X-ray Reflectometer for the Diagnostics of Thin Films During Growth", Journal of Applied Crystallograpyhy (1997), 30, 905-908.

* cited by examiner

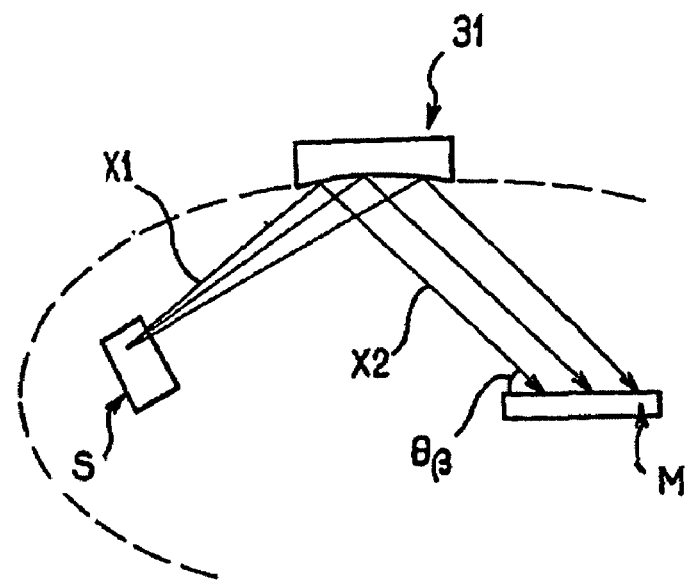
FIG_1
(Prior Art)
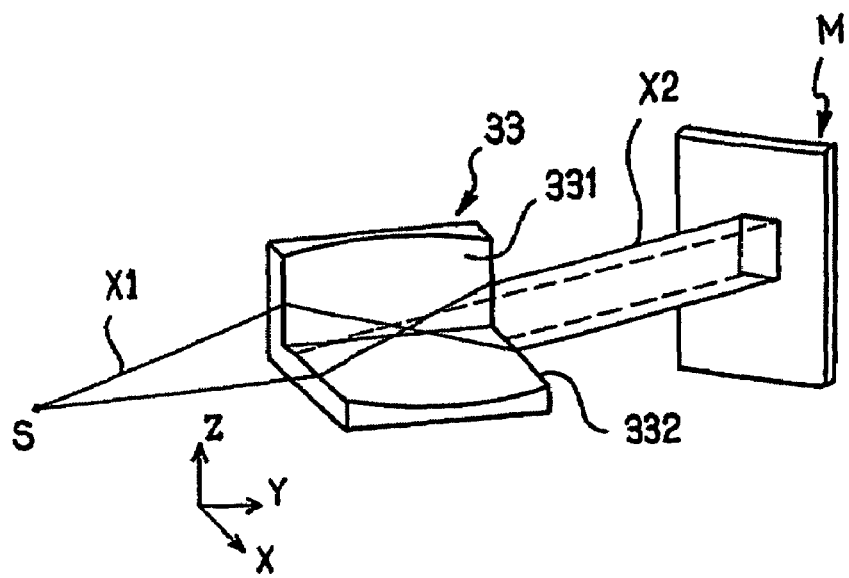
FIG_2
(Prior Art)

OPTICAL DEVICE FOR X-RAY APPLICATIONS

CROSS-REFERENCE TO RELATED APPLICATIONS

The present application is a national phase entry under 35 U.S.C. § 371 of International Application No. PCT/FR03/001879 filed Jun. 19, 2003, published in Dec. 31, 2003, which claims priority from FR03/00623 filed Jan. 21, 2003, which claims priority to FR02/07546, filed Jun. 19, 2002.

BACKGROUND OF THE INVENTION

1. Field of the Invention

The present invention concerns an optical device for X-ray instrumentation applications with high resolutions in wavelength.

More precisely, the invention concerns an optical device intended to treat an incident X-ray beam, said device comprising:

a monochromator, and an optical element for treating the incident beam whose reflective surface is able to produce a two-dimensional optical effect in order to adapt a beam in destination of the monochromator, said optical element comprising a surface reflecting X-rays of the multilayer structure type.

The reflective surface or surfaces used can in particular be of the multilayer type with lateral gradient.

The invention thus applies in all X-ray instrumentation fields using monochromators.

By way of example, the following applications can be cited non-limitingly:

high-resolution X-ray diffractometry,

X-ray fluorescence,

X-ray micromapping (or microcartography) applications for microelectronics.

The invention applies to X-ray instrumentation fields requiring excellent spectral purity and therefore the use of a monochromator.

The basic constituent element of the monochromator is a crystal which makes it possible to achieve very high resolutions, angular and in terms of wavelength. The monochromator can be formed from a crystal or several aligned crystals.

For monochromators of the type mentioned above, the diffraction of the incident X-rays is effected according to Bragg's law.

The Bragg condition for a crystal is of the form $n\lambda = 2d \sin \theta_B$ where n is the reflection order, $\lambda$ the wavelength of the incident radiation for which the diffraction occurs, d the spacing period between the atomic planes of the crystal involved in the diffraction and $\theta_B$ the angle of incidence on these same atomic planes which is necessary for the diffraction phenomenon to occur.

If an incident beam of X-rays is considered, the rays of wavelength $\lambda$ striking the crystal with an angle of incidence $\theta_B$ which is very precise with respect to a certain family of atomic planes of the crystal will be diffracted by these same atomic planes if the Bragg condition indicated above is satisfied.

This phenomenon of diffraction of a monochromatic beam occurs with a certain angular acceptance $\Delta\theta$ about the reference angle $\theta_B$.

This angular acceptance can therefore be defined by:

An angle $\theta_B$ corresponding to the reference angle of incidence of the diffractive rays on the monochromator ($\theta_B$ is known by the term Bragg angle), $\theta_B$ being a function of the crystal and the wavelength and corresponding to the maximum of the reflectivity peak $R=f(\theta)$ for a given wavelength, and A tolerance of $\Delta\theta$ about this reference angle of incidence. The tolerance defines the width of the range of angles of incidence which corresponds to the angular acceptance.

The monochromators used in the devices of the type mentioned above have a very small angular acceptance. By way of example, for a germanium crystal monochromator, used for example for applications where the X-ray source is a K$\alpha$ copper source ($\lambda = 1.54$ Angstroms), the angular acceptance is 0.00336° (about a reference angle of incidence of approximately 20°).

It will therefore be understood that, from a given X-ray source (this source being able for example to be of the rotating anode, X-ray tube or microsource type), without an appropriate conditioning of the X-rays emitted by the source, a large number of these rays which are emitted in all directions arrive at the monochromator with an angle of incidence well outside the angular acceptance of the monochromator.

These photons will not be able to be reflected by the monochromator and thus cause very large losses of flux.

2. Description of Related Art

To attempt to mitigate this drawback, it is known to dispose, upstream of the monochromator, means of conditioning the incident beam.

The main function of such conditioning means is to orient the largest possible part of the incident X-rays, at an angle of incidence (with respect to the surface of the monochromator) which is included within the incidence range defined by the angular acceptance of the monochromator about a reference angle of incidence $\theta_B$.

It is thus known to produce these conditioning means in the form of a glass capillary for collecting by total reflection a divergent initial beam issuing from a source and to collimate it into a beam directed towards a monochromator.

However, one limitation associated with such conditioning means is that this type of optical component can reflect X-rays only at very small angles of incidence (typically less than 0.1°).

Consequently the flux delivered by the optics is generally small.

It also known to produce the conditioning means in the form of a multilayer optical element producing a one-dimensional optical effect. These optical elements have a parabolic shape which makes it possible to collimate the divergent incident beam, and a multilayer coating which diffracts the incident X-rays according to Bragg's law.

One illustration of this known configuration will be found in FIG. 1, which depicts a source S of X-rays producing an initial beam X1 having a certain divergence in destination of conditioning means 31 (the parabola in which the surface of these conditioning means fits being depicted in a broken line).

Here also, the conditioning means reflect the initial beam X1 as a beam X2 directed towards a monochromator M.

A one-dimensional optical element of this type is known by the term Göbel mirror.

In the case of curved substrates such as Göbel mirrors, the multilayer has a layer structure (meaning thereby the period d of the multilayer) which varies along the mirror in order to maintain the Bragg conditions on a large surface of the mirror.

Such a multilayer mirror with lateral gradient thus allows reflection of the X-rays whose wavelength belongs to a predetermined domain, by different regions of the mirror on which the incident rays have variable local angles of incidence.

Such conditioning means make it possible to collimate the incident beam into a beam X2 in which the directions of propagation of the X-rays are made substantially parallel to an incident direction with respect to the monochromator which corresponds to the value $\theta_B$ of this monochromator, and this within the angular acceptance range of the monochromator.

However, such conditioning means allow the collimation of an initial beam X1 only in a single plane (the plane of FIG. 1 in the example which has just been described).

The divergences in the planes perpendicular to this plane are thus not treated: as a result many X-rays are not usable.

One limitation of these known conditioning means with one-dimensional effect is thus that, for a given initial beam X1, the flux of collimated X-rays in a direction compatible with the angular acceptance of the monochromator remains limited.

It should also be stated in this regard that it is necessary to have at the output from the monochromator a beam of small size in the fields of application of the invention (typically less than 2 mm).

The beam issuing from the monochromator in fact generates an "image spot" whose dimensions must be of this order of magnitude.

The image spot is included in a plane known as the "image plane".

To increase the "useful" flux arriving at the monochromator, it is known how to produce the means of conditioning the initial beam in the form of two-dimensional optics whose reflective surface exhibits a lateral gradient.

Such optics are produced in the form of a "side by side Kirkpatrick-Baez" device, as illustrated in FIG. 2.

In the remainder of this text, the "Kirkpatrick-Baez" configuration will be referred to as "KB".

This figure thus illustrates an element 33 comprising two mirrors 331 and 332 associated side by side (axis parallel to the direction Z for the mirror 331, to the direction X for the mirror 332).

The surfaces of these two mirrors have curvatures centred on two axes perpendicular to one another.

For this type of optics, the conditioning desired is provided by a double reflection, each mirror 331, 332 producing a one-dimensional optical effect along one axis.

Each of the two mirrors can thus produce a collimation or a focusing.

A monochromator M receives the flux X2 reflected by the element 33.

A description of this type of optical element 33 will be found in the patent U.S. Pat. No. 6,041,099.

It should be stated that the conditioning means can also be produced in the form of a "KB" device where the two mirrors are not disposed side by side.

Compared with conditioning means of the Göbel mirror type, such conditioning means with two-dimensional effect make it possible to recover, within a range of angles of incidence compatible with the angular acceptance of a monochromator, a greater proportion of rays issuing from a divergent initial beam X1.

SUMMARY OF THE INVENTION

One aim of the invention is to improve still further the performance of such devices.

In particular, the invention aims to collect a maximum amount of flux from a divergent initial beam and to produce at the output a monochromatic flux which is superior compared with what can be produced by a device comprising conditioning means as described above.

Thus the invention in particular aims, in order to increase the flux at the output of such devices, to make it possible to exploit X-ray sources of increased size.

The invention also aims to make it possible to improve the compactness of such devices.

In order to achieve these aims, the invention proposes an optical device intended to treat an incident X-ray beam, said device comprising:

a monochromator (M) and an optical element (20) for treating the incident beam whose reflective surface is able to produce a two-dimensional optical effect in order to adapt a beam in destination of the monochromator, said optical element comprising a surface reflecting X-rays of the multilayer structure type, characterised by the fact that said reflective surface consists of a single surface, said reflective surface being shaped according to two curvatures corresponding to two different directions.

Preferred but non-limiting aspects of this device are as follows:

said single reflective surface is of the multilayer type with lateral gradient, said single reflective surface comprises a depth gradient, said reflective surface is shaped in each of the said two different directions in order to produce two respective one-dimensional effects, said reflective surface has a geometry which is substantially circular in a first direction and substantially parabolic in a second direction, said first direction is the saggital direction of the optical element and the second direction is the meridional direction of the optical element, said reflective surface has a substantially toroidal geometry, said reflective surface has a substantially paraboloidal geometry, said reflective surface has a substantially ellipsoidal geometry, said reflective surface is able to reflect rays of the lines Cu—K$\alpha$ or Mo—K$\alpha$, the monochromator is a germanium crystal and the optical conditioning element consists of a W/Si multilayer coating with lateral gradient, the optical element of said device has a length of around 2 cm, said device being able to be used with an X-ray source whose size is around a few tens of microns by a few tens of microns, in order to produce a sample spot of around 300*300 microns.

BRIEF DESCRIPTION OF THE DRAWINGS

Other aspects, aims and advantages of the invention will emerge more clearly from a reading of the following description of the invention, given with reference to the accompanying drawings in which, apart from FIGS. 1 and 2 which have been commented on with reference to the prior art.

DETAILED DESCRIPTION

As a preamble to this description, it should be stated that the figures are intended to illustrate the principle of the invention and do not necessarily depict the dimensions and scales realistically.

This is true in particular for the angles of incidence (or even reflection) of the X-rays.

These X-rays in reality arrive on the reflective surfaces according to the invention with an angle of incidence of less than 10°.

The meridional and saggital directions are also defined with respect to the general direction of propagation of the X-ray beam:
- The meridional direction corresponds to the mean direction of propagation of this beam (and more precisely to the mean direction between the mean directions of propagation of the beam before and after its reflection on the optical assemblies concerned),
- The saggital direction corresponds to a horizontal transverse direction of this meridional direction (the vertical being defined here by the mean normal to the part of the reflective surface of the optical assemblies which will be described and which is actually used for reflecting the incident X-ray beam).

DESCRIPTION OF ONE EMBODIMENT OF THE INVENTION

Figure 3:
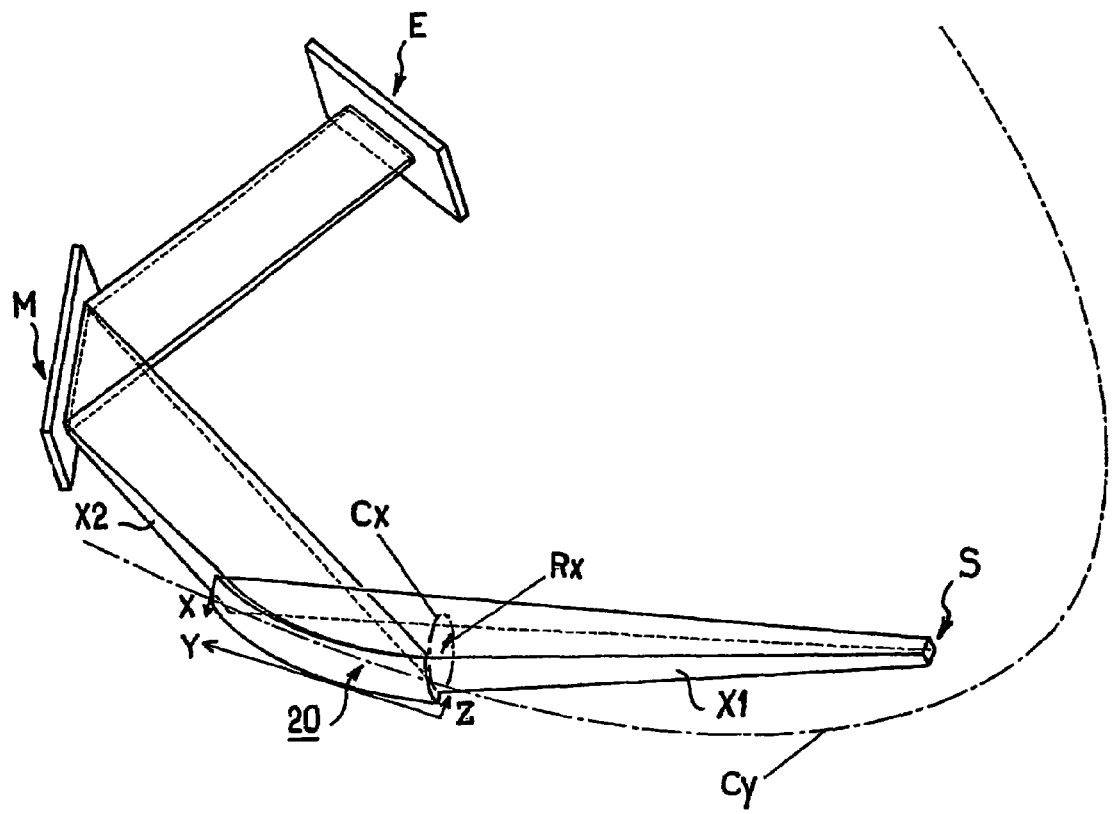
FIG. 3 depicts an overall view of an optical device according to one embodiment of the invention.

With reference to FIG. 3, a device according to the invention is shown placed upstream of a sample E.

This device comprises:
- means of conditioning an initial X-ray beam, denoted X1, having a certain divergence,
- a monochromator M associated with a given angular acceptance.

The conditioning means are in this embodiment of the invention produced in the form of an optical element 20 intended to reflect the rays of the initial beam X1 issuing from a source S of X-rays.

In the case of FIG. 3, the optical element 30 provides collimation in a first dimension and focusing in a second different dimension.

The source S can in particular be of the X-ray tube, rotating anode or X-ray source with microfocus type.

The optical element 20 comprises a multilayer structure formed on a substrate (for example made from glass), which defines a reflective surface for the X-rays of the beam X1.

The single reflective surface of this optical element has a special geometry.

More precisely, this reflective surface is shaped according to two curvatures corresponding to two different directions.

This reflective surface thus has significant differences with respect to reflective surfaces of the type used in optical assemblies such as those disclosed by the document U.S. Pat. No. 6,041,099:
- The reflective surface is a single reflective surface, unlike what is the case with optical assemblies in which two different elementary mirrors have been assembled,
- This reflective surface is regular (this term meaning in the present text that the reflective surface does not exhibit any second-order discontinuity: angular points or edges—salient or hollow—etc),
- Moreover, a difference which is also significant is that, in the case of the invention, the incident rays undergo only a single reflection in order to produce the required two-dimensional optical effect, whilst two reflections are necessary in the case of an optical assembly using conditioning means reproducing for example the teachings of the document U.S. Pat. No. 6,041,099.

Description of the Optical Conditioning Element Considered in the Invention

Before describing in detail the embodiment illustrated in FIG. 3, the general characteristics of the invention will be disclosed.

The reflective surface of the optical element according to the invention has a curvature Cx in the saggital direction X and a curvature Cy in the meridional direction Y.

FIG. 3 represents these curvatures, two curves Cx and Cy having been depicted in broken lines.

Each of the curves Cx, Cy can be a circle, but also an ellipse, a parabola or other curve (open or closed).

In any event, the reflective surface of the optical conditioning element does not have a simple spherical shape.

Each of the curves Cx, Cy is thus associated with a different direction in space (two perpendicular directions in the example commented on here).

And each of these curves produces a one-dimensional optical effect on the X-rays which have just been reflected on the reflective surface:
- The curve Cx produces a one-dimensional optical effect in the direction X,
- The curve Cy produces a one-dimensional optical effect in the direction Y.

And each of these dimensional effects depends on the curvature associated with the curve and its law of change along this curve.

It will thus be possible to parameterise the curves Cx and Cy in order to selectively obtain associated one-dimensional effects such as a focusing or a one-dimensional collimation.

FIG. 3 depicts one embodiment of the invention.

In this embodiment, the curve Cx produces a one-dimensional focusing and the curve Cy produces a one-dimensional collimation.

The reflective surface of the multilayer of the optical element 20 of FIG. 3 is for this purpose shaped in the respective directions X and Y in two curves Cx and Cy respectively circular and parabolic, each of these curves producing a one-dimensional effect in a given plane, respectively in the plane XY and in the plane YZ.

Thus, from the divergent beam X1, a collimation is generated in one dimension in space and a focusing in another dimension.

According to a variant of the invention the means of conditioning the incident beam on the monochromator can be an optical element providing a collimation in two dimensions.

In this case, the curves Cx and Cy are both shaped as parabolae.

Returning to the embodiment of the invention in FIG. 3, the monochromator M is positioned so that the mean direction of the beam X2 corresponds to the angle of incidence $\theta_B$ of the monochromator, or to an angle compatible with the angular acceptance of this monochromator.

In this way the X-rays flux which arrives at the monochromator within the tolerances defined by the angular acceptance of this monochromator is maximised in the vertical direction (direction Z) but also in the saggital direction.

It should be stated here that it is thus possible to produce according to the invention conditioning means with optical elements composed of a multilayer mirror (with lateral gradient, and possibly also with depth gradient as will be seen later in this text), whose reflective surface can have one from amongst various aspherical complex shapes making it possible to fulfil the necessary function for redirecting the reflected beam X2 to the monochromator.

It is thus possible in particular to give this reflective surface one of the following geometries:
geometry with a substantially toroidal shape,
geometry with a substantially paraboloidal shape,
geometry with a substantially ellipsoidal shape,
geometry with a substantially circular shape in a first direction (in particular the saggital direction) and a substantially parabolic shape in a second direction (in particular the meridional direction).

The lateral gradient can in particular extend in the meridional direction of the incident X-rays.

And the period of the multilayer can be adapted to reflect in particular rays of the lines Cu—K$\alpha$ or Mo—K$\alpha$.

In the case of an embodiment of the invention with a focusing in the saggital plane (that is to say in the plane XY in FIG. 3) the radius of curvature Rx (saggital radius of curvature) can have a value of less than 20 mm, necessary for focusings over short distances, less than 90 cm (the source-point focusing distance) according to one favoured application of the invention.

It will be noted that the optical element used as a beam conditioning means in the device according to the invention dispenses with the drawbacks and limitations of the optical assemblies of the KB type. In particular:
this optical assembly is in a single piece (not requiring any tricky assembly)
the incident X-rays undergo only a single reflection on its reflective surface.

It was stated that the reflective surface of the optical element 20 was defined by a multilayer.

This multilayer (like all multilayers dealt with in this text) in practically all cases comprises at a minimum one "lateral gradient".

This characteristic makes it possible to effectively reflect the X-rays having different local angles of incidence with respect to the reflective surface of the element 20.

It will be understood in fact that the various points on this reflective surface do not receive the incident X-rays with the same local angle of incidence (because of the divergence of the incident beam and the geometry of this reflective surface).

Multilayer with lateral gradient means here a multilayer where the layer structure is adapted so that the Bragg condition is complied with at every point on the useful surface of the mirror.

Thus, for a radiation of incident X-rays in a narrow wavelength band containing for example the K$\alpha$ lines of copper (Cu—K$\alpha$ lines with wavelengths close to 0.154 nm), the multilayer mirror with lateral gradient makes it possible to maintain the Bragg conditions over the entire useful surface of the mirror.

This leads to the reflection of the band with a predetermined wavelength (in the above example containing the copper K$\alpha$ lines), by different regions of the mirror on which the incident rays have variable local angles of incidence.

It is thus possible to increase the surface area of the mirror which is actually used.

The gradient is obtained by varying the period of the multilayer according to the position on the mirror.

This type of lateral-gradient multilayer structure thus makes it possible to increase the solid angle of collection of the optical assembly, which leads to a higher reflected flux for an identical geometry compared with monolayer mirrors functioning in total reflection.

It should however be noted that, in extreme cases, the multilayer may not have a lateral gradient in particular if the curvature of the optical element is small and does not require this type of gradient.

The multilayer of the various embodiments of the invention can also have a depth gradient.

Such a depth gradient makes it possible to fulfil the Bragg conditions for fixed angles of incidence and variable wavelengths, or vice-versa.

It is thus possible for example to increase the wavelength bandwidth of the multilayer of the optical assembly, and to focus or collimate X-rays with different wavelengths, at one and the same given image plane (the case of a fixed geometry—that is to say a configuration in which the relative positions of the source of incident rays, of the optical assembly and of the image plane are fixed).

In this way it is possible to use sources of X-rays with different wavelengths to reflect the X-rays issuing from the various sources with the same optical assembly, without this requiring a new positioning of the source and/or of the image plane or planes with respect to the optical assembly.

In this case use is made of the tolerance in wavelength of the optical assembly (tolerance in $\Delta\lambda$).

In the same way, it is also possible to translate this tolerance in $\Delta\lambda$ into a tolerance in $\Delta\theta$, $\theta$ being the angle of incidence on the element 20.

A tolerance on the wavelength corresponding in fact—in the context of the Bragg condition—to a tolerance on the angle of incidence, it is possible, for a constant wavelength of the incident beam, to collect and reflect an incident light flux where the rays with the same wavelength have different local angles of incidence.

In particular it is possible in this way to use sources of X-rays of larger size (increase in the angular acceptance of the optical component).

Producing the conditioning means with a depth gradient in the multilayer thus constitutes one option for implementing the invention.

Information on the Two-Dimensional Conditioning Means

The use of a two-dimensional optics for conditioning the incident radiation on a monochromator may in particular make it possible to achieve a collimation in a first dimension in order to maintain a fixed angle of incidence on the reference plane of the monochromator whilst producing a second one-dimensional effect in a second dimension (defined by the saggital plane XY) in order to collect a maximum incident flux.

The conditioning in the second dimension can be a focusing or a collimation.

By way of illustration, such a function is depicted in FIG. 3: the divergent rays in the plane YZ are collimated in the plane YZ in order to maintain, for the beam X2 (which is reflected by the conditioning element 20), an angle of incidence of around $\theta_B$ in the angular acceptance of the monochromator.

The collimation function according to the first dimension, produced by the optical element 20, makes it possible to limit the angular divergence of the beams in the diffraction plane (for each reflected X-ray, the diffraction plane is defined as the plane perpendicular to the reflective surface containing the incident beams and the reflected beams).

For the purpose of increasing the X-ray flux collected at the sample, it is advantageous to effect a conditioning in a second dimension, for example in the case of FIG. 3 in the XY plane (saggital plane).

This makes it possible to limit the divergence in this plane and thus to maximise the X-ray flux collected from the source and projected at the sample after reflection on the monochromator.

This conditioning in the second dimension (still with reference to FIG. 3) is carried out whilst ensuring the operating conditions of the monochromator (limiting the angular divergence in the diffraction plane). As indicated previously, the conditioning in the second dimension may be a focusing or a collimation.

The possibility of increasing the flux in the second direction (saggital) by effecting a focusing is notably advantageous as the angular divergence a tolerated in the saggital plane at the monochromator is great in the case of the applications in question.

This is because a divergence $\alpha$ in the second dimension (the saggital dimension) has little effect on the angle of incidence of the incident X-rays on the monochromator in the case of the field of application of the invention (for the focusing conditions encountered and the types of monochromators in question).

Figure 4:
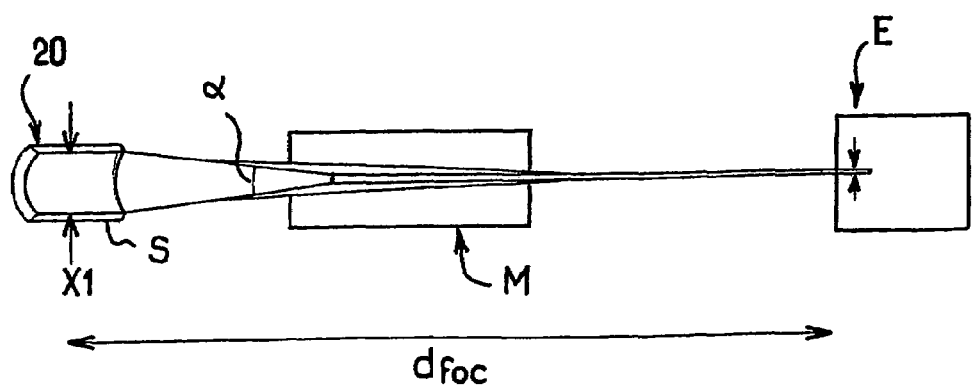
FIG. 4 is a top view of the same device.

With reference to FIG. 4, the divergence a in the saggital plane is given by the useful width of the conditioning optics $X_I$ in this same plane (determined for example at the centre of the optics), and the focusing distances $d_{Foc}$ (optics-image spot distance). The divergence $\alpha$ in the direction X can thus be approximated by the following equation:

$$\mathrm{Tan}(\alpha) = ((X_f/2 - L/2)/(d_{Foc})), \text{ where L is the width of the image spot in the saggital plane.}$$

It is known that the angular tolerance of a monochromator on a divergence $\alpha$ in the saggital plane (which will be called $\Delta\alpha$) is a function of the Bragg angle $\theta_B$ and of the angular acceptance $\Delta\theta$ of this monochromator. With reference to the document by M. Schuster and H. Göbel, J. Phys. D: Applied Physics 28 (1995) A270-A275 "Parallel-Beam Coupling into channel-cut monochromators using tailored multilayers", this angular tolerance $\Delta\alpha$ can be expressed as follows:

$$((\Delta\theta/\tan\theta_B)*2)^{1/2} = \Delta\alpha, \text{ in this formula } \Delta\alpha \text{ and } \Delta\theta$$

are expressed in radians.

The tolerance on the angular divergence in the saggital plane can thus be determined by way of example for a germanium crystal for Cu—K$\alpha$ applications ($\theta_B$=22.650, $\Delta\theta$=0.00336°).

Thus limit divergences (angular tolerance on the divergence of the beam X2) of the order of 1° are calculated, which is well above the convergences required for the field of application of the invention.

Consequently the monochromator can accept more divergence of the incident beam X2 in the second direction in question (the direction X in FIG. 3).

It is therefore advantageous to collect a maximum amount of flux from the source for the second direction in question (the saggital direction).

This general objective concerns both the device according to the invention and the devices using in a known manner, as conditioning means, an optical assembly of the KB type.

Additional Highlight on Specific Advantages Compared with Devices Comprising Conditioning Means of the KB Type In the second direction in question, that is to say the direction for which the monochromator can tolerate more divergence (in the case of FIG. 3 the direction X) the invention makes it possible to collect more flux from the source compared with the device implementing an initial beam conditioning by a two-dimensional optical assembly of the "KB" type (side by side or not) with multilayer coatings.

Two phenomena give rise to this gain in flux and they will be explained below.

Firstly, in the case of the invention with an optical element such as the element 20, having a given length (in the meridional direction), a capture angle is obtained in the saggital direction which is greater than what is obtained with a conventional configuration implementing a conditioning by KB optics, Secondly, the two-dimensional optical element 20 as used in the invention can accept more divergence of the initial beam X1 in a saggital direction, and therefore picks up a larger surface of the source at any point on this element 20.

This is because, and with reference to the first type of advantage mentioned above, in the case of the conditioning carried out by an optical assembly of the KB type, in order to increase the solid angle of collection in a direction transverse to the mean direction of propagation of the beam on the optical assembly, it is necessary to increase the length of this optical assembly.

This is because obtaining a two-dimensional effect according to a KB configuration is linked to a double reflection.

By way of illustration and considering FIG. 2, if the device is extended in the X or Z direction it is necessary to extend the mirror in the Y direction.

Figure 5A:
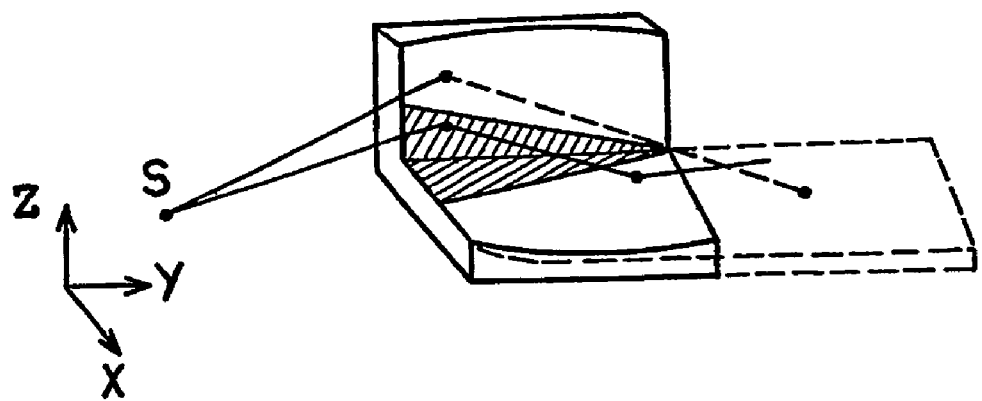
FIGS. 5a and 5b illustrate the extension which would be required in the case of the adaptation of devices of the known type, in order to achieve a performance comparable with the device according to the invention, which is more compact.
Figure 5B:
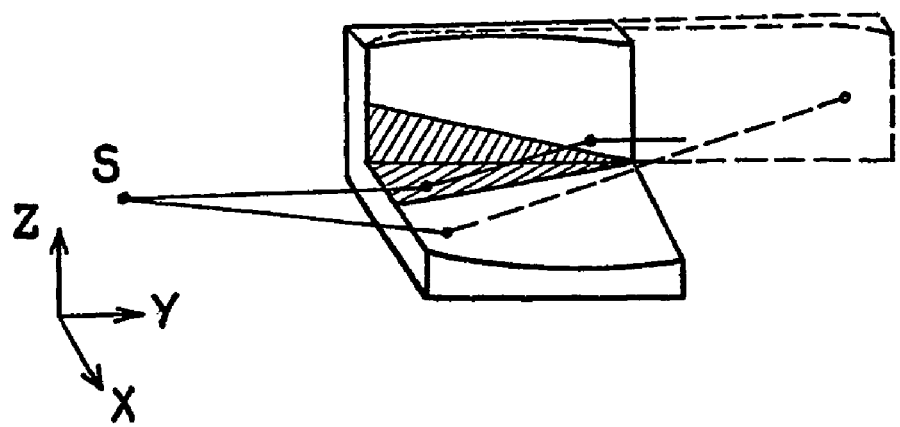

This phenomenon is illustrated in FIGS. 5a and 5b.

It is in fact known that, for optical elements of the KB type, any incident ray must strike the optics in a particular area (corresponding to the hatched areas in FIGS. 5a and 5b) in order to undergo a double reflection.

The result therefore is that, for such a known type of optical conditioning element (whether or not the mirrors are contiguous), the solid angle able to be collected is limited by the length of the component both for the horizontal transverse directions and for the vertical transverse directions (direction Z or direction X).

For the optical assembly of the KB type, the length of the component (in the meridional direction) therefore has an influence both on the transverse components and the longitudinal components of the solid angle of collection.

In the case of the invention, it is possible to increase the solid angle of collection in a saggital direction, without increasing the length of the device.

This is important in particular in the case where it is wished to limit the bulk and therefore the size of the optics.

This is in particular the case by way of example for applications of X-ray micromapping for microelectronics where the sources used are X-ray microsources having sizes of a few tens of microns by a few tens of microns (for example 40 microns by 40 microns) and the sample spot analysed is of the order of a hundred microns by a hundred microns (for example 300 microns by 300 microns).

It is wished in this case to limit the length of the optical conditioning element to approximately 2 cm.

And in general terms, for applications where it is sought to limit the length of the device, the optical combination used in the invention proves to be particularly advantageous and makes it possible to maximise the flux reflected by the monochromator whilst minimising the size of the device.

In addition, an extension of the conditioning mirror in a meridional direction (which is the mean direction of propagation of the X-rays on the optics) has the effect of increasing the multilayer surface on which a lateral gradient is applied.

This type of gradient is applied in order to compensate for the curvature of the surface of the optical component.

In FIGS. 5a and 5b, the gradient of the multilayers is applied along the Y axis for the two mirrors of the optical assembly.

In consequence increasing the length of the component amounts to increasing the surface on which a gradient is applied—which amounts to making the manufacture of the device more complex.

For conditioning optics with a single reflection such as those considered in the invention, the solid angle of collection can be increased in a saggital direction by way of example by increasing simply the size of removable slots which can be positioned at the entry and exit of the optics.

Another advantage of the invention is the possibility of capturing a larger source surface at a given point on the optical conditioning assembly and thus being able to maximise the flux at the image spot.

Figure 6A:
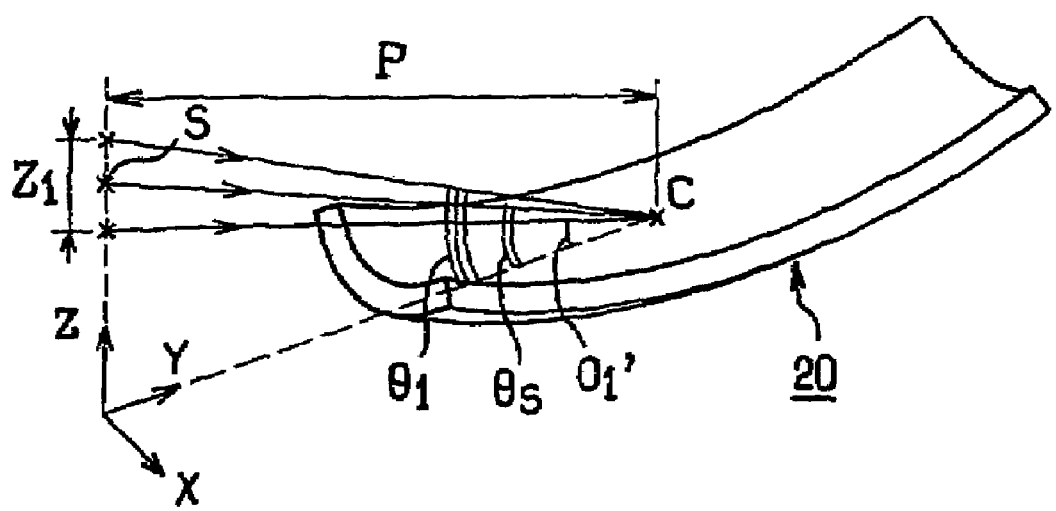
FIGS. 6a and 6b are illustration diagrams making it possible to determine the angular divergence tolerated at a given point of a two-dimensional-effect optical conditioning element as considered in the invention.
Figure 6B:
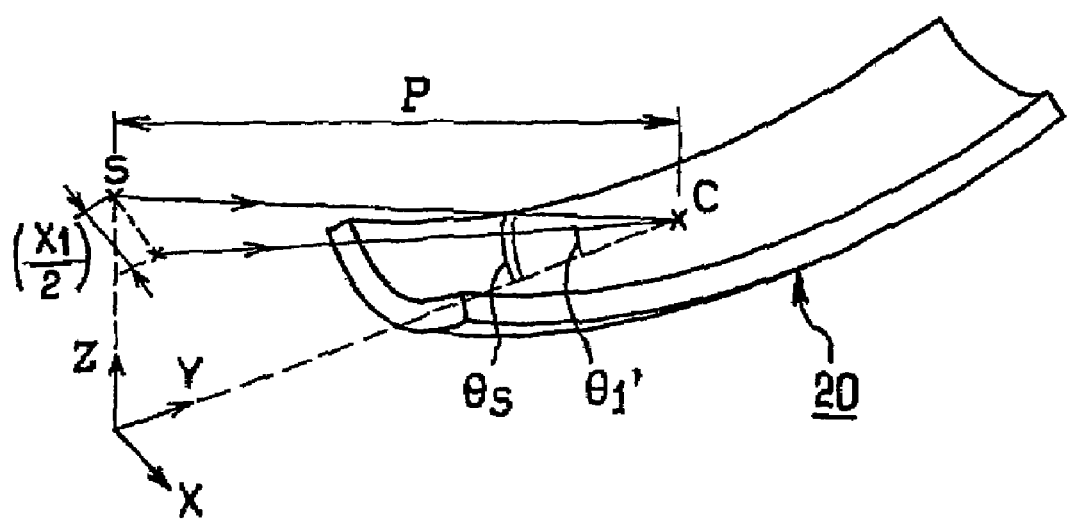

This phenomenon can be illustrated by means of FIGS. 6a and 6b and FIG. 2, if an X-ray source whose surface is parallel to the plane XZ defined in these figures is considered.

FIGS. 6a and 6b illustrate an optical conditioning element 20 as used in the invention.

If an alignment of the various optics according to FIGS. 6a and 6b in FIG. 2 is considered, for the optical conditioning element as considered in the invention, the angular divergence of the incident X-rays tolerated in a saggital direction at any point on the optics is relatively large in comparison with the angular divergence tolerated for the conditioning optics of the KB type in the same direction (that is to say the direction X).

Along the other dimension of the source (that is to say the direction Z), the angular divergences tolerated at any point on the two types of two-dimensional-effect optics are very close and limited by the angular acceptance of the multilayer.

A movement of the incident X-ray emission source point from the centre S of the source in the direction Z has an influence directly and significantly on the angle of incidence of these X-rays at a given point on the two-dimensional optical element whatever the type of optics in question (of the KB type or an optics with a single reflection as considered in the invention).

In the case of the optical conditioning element as considered in the invention, and with reference to FIGS. 6a and 6b, an opening of the emission beam in the direction X (which corresponds to the saggital direction) compared with a direct beam coming from the centre of the source gives rise to only small variations on the angle of incidence at any point on the optics.

With reference to these FIGS. 6a and 6b, it is possible to determine the angular divergence tolerated for the incident X-rays at the centre C of the conditioning optics.

The source size in the direction Z able to be reflected effectively at the centre of the optics is given by the following equation:

$Z_I = (\cos \theta_s * p)(\tan \theta_I - \tan \theta_{I'})$, where p is the distance between the centre of the source and the centre of the optics, $\theta_s$ is the angle of incidence on the optics for a ray issuing from the centre S of the source, and $\theta_I$ and $\theta_{I'}$, the limit angles of incidence given by the angular acceptance of the multilayer ($\Delta\theta = \theta_I - \theta_{I'}$).

Still with reference to FIGS. 6a and 6b, in the case of the direction X, the source size able to be reflected at the centre C of the optics is given by the following equation:

$X_I = 2((p \sin \theta_s / \tan \theta_{I'})^2 - (p \cos \theta_s)^2)^{1/2}$.

The values $X_I$ and $Z_I$ given above are source sizes determined within the limit of the angular acceptance of the multilayer.

By way of example, for W/Si coatings used for copper Kα applications, the angular acceptance of the multilayer (of the optical conditioning element 20) is 0.052° about an angle of 1.26°.

It can also be considered that the optics and source are aligned so that the angle of incidence $\theta_s$ on the optics of a beam issuing from the centre of the source is given by the Bragg angle of the multilayer.

For standard source-optics distances of 12 cm, the source size able to be collected in a saggital direction at the centre of the optics as considered in the invention could thus be of the order of 5 cm, and approximately 110 microns for the direction Z.

Still by way of example, in the case of KB optical assemblies for one and the same type of multilayer and source-optics distance, the source size able to be collected effectively at a given point is limited to approximately 110 microns for the two directions concerned (X and Z with reference to FIG. 2). We will return to the reasons explaining this later in the description.

The values mentioned above constitute theoretical limits (in the above cases for a W/Si multilayer) of the angular divergence of the incident beam which can be tolerated by the optical conditioning elements compared above.

However, it is also necessary, in the case of a device according to the invention, to consider the divergence tolerated by the monochromator in the saggital direction as well as the specifications relating to the image which it is wished to obtain (size, distance), in order finally to maximise the flux collected at the image spot.

Taking these considerations into account, the potential gain in flux captured from the source for optical conditioning elements as considered in the invention is significant.

Indeed, if by way of example consideration is given to a standard X-ray source of size 300 microns by 300 microns with a distance of 12 cm between the X-ray source and the optical conditioning assembly, at a given point on this optical assembly it is possible to see a larger surface of the source in the saggital direction than in the case of known devices, with a conditioning by KB optical assembly.

In the case of the invention, it is thus possible to collect the 300 microns of the source in the saggital direction at any point on the optics and this can represent a sure advantage in the case where the image spot required is relatively broad in the saggital direction, for example for image spots 1 mm wide positioned at 40 cm from the optics.

It will therefore be understood that the device according to the invention tolerates a relatively large divergence of the beam X1 issuing from the source, in a particular direction. This is not the case with the known devices using conditioning elements of the KB type.

With reference to FIG. 2 and the KB optics, the direction which provides a certain degree of freedom on the divergence of the incident beam which is effectively reflected at a given point on the optics for the first horizontal mirror 332 is the direction perpendicular to the centre of the second optics, which is the vertical mirror 331.

However, in the case of this known configuration with two mirrors, the direction perpendicular or approximately perpendicular to the surface of the mirror corresponds to the direction in which the divergence of an incident beam gives rise to significant variations on the angle of incidence.

The source size able to be collected at a given point on the assemblies of the KB type is therefore, due to the double reflection phenomenon, limited by the angular acceptance of the multilayer for the two dimensions of the source. The invention also dispenses with this limitation.

The invention claimed is:

1. An optical device for treating an incident X-ray beam, said device comprising:
   a monochromator; and
   an optical element for conditioning the incident X-ray beam, the optical element including an X-ray reflective surface having a multilayer structure to produce a two-dimensional optical effect in order to adapt a beam directed towards the monochromator;
   wherein said reflective surface consists of a single surface, said reflective surface being shaped according to two curvatures corresponding to two different directions in order to produce respective one-dimensional effects, wherein one of the one-dimensional effects is a collimation for limiting the divergence in the diffraction plane of the monochromator, and the other one-dimensional effect is a focusing.

2. The optical device according to claim 1, wherein said single reflective surface is of a multilayer type with a lateral gradient.

3. The optical device according to claim 1, wherein the single reflective surface comprises a depth gradient.

4. The optical device according to claim 1, wherein said reflective surface has a geometry which is substantially circular in a first direction and substantially parabolic in a second direction.

5. The optical device according to claim 4, wherein said first direction is a saggital direction of the optical element and the second direction is a meridional direction of the optical element.

6. The optical device according to claim 1, wherein said reflective surface has a substantially toroidal geometry.

7. The optical device according to claim 1, wherein said reflective surface has a substantially paraboloidal geometry.

8. The optical device according to claim 1, wherein said reflective surface has a substantially ellipsoidal geometry.

9. The optical device according to claim 1, wherein said reflective surface is able to reflect rays of lines Cu—K or Mo—K.

10. The optical device according to claim 1, wherein the monochromator comprises a germanium crystal, and the optical element comprises a W/Si multilayer coating with a lateral gradient.

11. The optical device according to claim 1, wherein the optical element of the optical device has a length of around 2 cm, said optical device being usable with a source of X-rays having a size of around 40 microns by 40 microns in order to produce a sample spot of around 300*300 microns.

12. The optical device according to claim 1, wherein said reflective surface has a geometry defined by an open or closed curve different from a circle in a first one of the directions and substantially parabolic in a second one of the directions.

13. The optical device according to claim 1, wherein said reflective surface has a geometry substantially elliptical in a first one of the directions and substantially parabolic in a second one of the directions.

14. The optical device according to claim 1, wherein said reflecting surface has a geometry substantially parabolic in the two different directions.

15. The optical device according to claim 1, wherein the reflective surface has a radius of curvature lower than 20 mm along the saggital direction of the optical element.

* * * * *

UNITED STATES PATENT AND TRADEMARK OFFICE
CERTIFICATE OF CORRECTION

PATENT NO.         : 7,430,277 B2
APPLICATION NO. : 10/518284
DATED                : September 30, 2008
INVENTOR(S)      : Peter Hoghoj, Aurélien Dariel and Sergio Rodrigues Page 1 of 1

It is certified that error appears in the above-identified patent and that said Letters Patent is hereby corrected as shown below:

Specification Col. 7, Line 21, "Kαor", should read -- Kα or --.

Specification Col. 9, Line 17, after "divergence", "a" should read -- α --.

Specification Col. 9, Line 26, after "divergence", "a" should read -- α --.

Signed and Sealed this

Ninth Day of December, 2008

JON W. DUDAS
*Director of the United States Patent and Trademark Office*